M. SCHULTZ.

STEAM PUMP.

No. 9,818. Reissued July 19, 1881.

Attest
C. P. Doolittle
C. F. Hesser

Inventor
Michael Schultz
by Zell & Hosea
Attorney

N. PETERS, Photo-Lithographer, Washington, D. C.

UNITED STATES PATENT OFFICE.

MICHAEL SCHULTZ, OF CINCINNATI, OHIO.

STEAM-PUMP.

SPECIFICATION forming part of Reissued Letters Patent No. 9,818, dated July 19, 1881.

Original No. 204,619, dated June 4, 1878; Reissue No. 8,798, dated July 8, 1879. Application for reissue filed March 22, 1881.

*To all whom it may concern:*

Be it known that I, MICHAEL SCHULTZ, of Cincinnati, Hamilton county, Ohio, have invented a new and useful Improvement in Steam-Pumps, of which the following is a full, clear, and exact description, reference being had to the accompanying drawings, forming a part of this specification, and to the letters of reference marked thereon.

My invention relates to a class of pumps employing a steam and pumping piston combined and acting in the same axial line, and a yoke device to impart motion to a governing fly-wheel through a crank-pin; and its object is to improve the construction, increase the efficiency, and economize the cost of such pumps.

To this end my invention consists, first, in substituting a crank-plate for the ordinary crank on the fly-wheel shaft, and arranging the yoke so as to play across the face of the crank-plate in contact therewith, so as to be guided and retained in its proper plane by the crank-plate; second, in a concave shell-frame, connecting the steam and pumping cylinders, arranged around the sides and rear of the pistons and yoke, being wholly open in front, and having a bearing for the fly-wheel shaft between the cylinders, at the rear of and in said connecting-frame; third, in combining with the connecting-frame so constructed a double-armed brace or bracket seated upon the base-plate, one of said arms supporting the pump-frame, and the other supporting the outer end of the fly-wheel shaft; fourth, in the construction of the yoke, whereby an oil-trough is formed therein; fifth, in forming one-half of the yoke and its contiguous piston in one piece.

Figure 1:
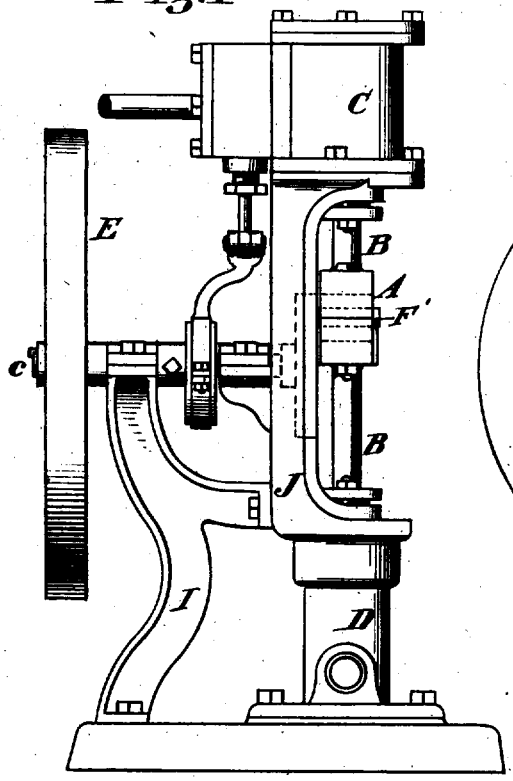
Figure 2:
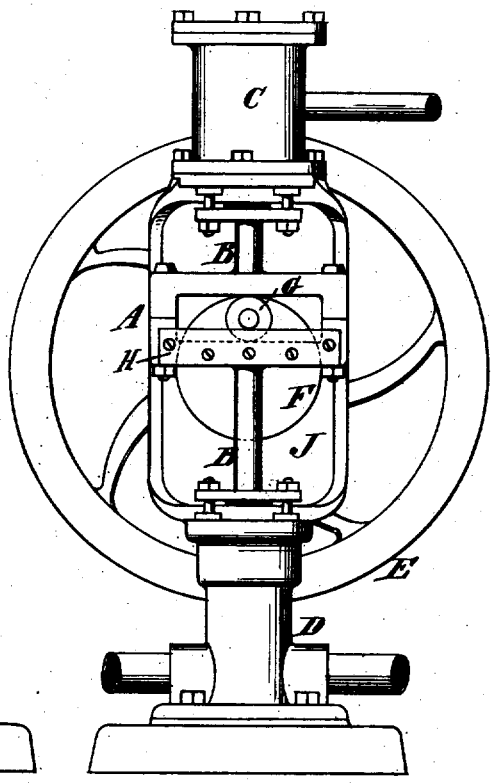
Figure 3:
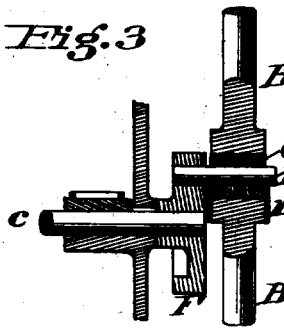
Figure 4:
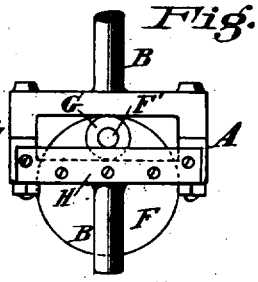

In the accompanying drawings, Figure 1 is a side elevation of a steam-pump embodying my invention. Fig. 2 is a front elevation of the same. Fig. 3 is a side elevation of the crank-wheel and pin, with the yoke and roller in section. Fig. 4 is a front elevation of the yoke and crank-wheel and their immediate connections.

Similar letters of reference indicate similar parts in both specification and drawings.

C is the steam-cylinder, and D the pump-barrel, of the direct-acting steam-pump shown in the drawings. These parts are arranged in the same axial line, and between them operates the cross-head or yoke A, formed in two parts, each of which is cast with a corresponding section of the piston B, and plays vertically between the steam and pumping cylinders C D.

By means of a roller, G, upon the crank-pin F′ of the crank-wheel F, moving laterally between the parallel faces of the yoke A, rotary motion is given to the shaft C and governing fly-wheel E, by which the slide-valve is operated and the movements of the pump regulated.

Pumps of this class have been constructed with a side brace connecting the two cylinders, but being simply a brace or standard, and extending outward at some distance from the axial line of the cylinders, could not afford the necessary rigidity and strength to resist the lateral strains produced by the use of a yoke. Neither was it practicable to obtain in a side brace of this kind a bearing for the fly-wheel shaft in the plane of the cylinder-axis, which was therefore placed out of the line of the propelling force and operated by a crank and connecting-rod.

Pumps of this class have also been constructed with braces or supports connecting the cylinders on two opposite sides, being wholly open in front and rear, in which construction the bearings of the fly-wheel shaft were of necessity wholly independent of the frame connecting the cylinders, thereby rendering a proper alignment of the parts next to impossible to obtain or preserve under the conditions of use.

To obviate these disadvantages and obtain a frame of the necessary lightness, strength, and lateral rigidity, which will allow the use of a yoke, and be entirely open upon one side, yet furnish a bearing at the rear in the connecting-frame itself for the fly-wheel shaft, I employ a frame, J, in the form of a concave shell, extending around the pistons and yoke, at the sides and rear. Through this frame, in the plane of the cylinder-axes, the driving-shaft passes, resting in a solid bearing in or upon it, while the crank-wheel operates within its concavity. By this means several important advantages are secured, to wit: a solid bearing for the shaft near and in the plane of the pistons in the frame; a frame combining economy of metal and strength to resist lateral strains in both directions; and economy of space in the disposition of the parts, whereby the entire structure is rendered more compact and efficient, and also a ready access to all working parts is afforded.

In small pumps the frame J may be cast in one piece with the cylinders; but in larger constructions I prefer to cast the pump, frame, and lower head of the steam-cylinder in one piece and bolt the steam-cylinder to its head independently. This construction and arrangement of the parts enables me to introduce certain other advantages, among which is the substitution of the crank-wheel F in place of the ordinary crank, besides affording more convenient access to the yoke A and its connections, the pistons, and stuffing-boxes, for removal or repair.

The crank-shaft heretofore used in steam-pumps was usually and preferably forged from a single piece of metal, and, besides being expensive to construct, was peculiarly subject to injury in this kind of machinery. Any obstruction in the pump which interfered with its full stroke, such as scale from the boiler, (which is liable to be drawn into the pump,) would almost invariably spring or break the crank-shaft, thus necessitating the frequent removal and repair of the entire shaft. These repairs were, of course, difficult and expensive to make, besides rendering the pump inoperative for a considerable period.

By substituting a crank-wheel, F, and pin F′, a much cheaper and stronger construction is secured, while the same causes of injury referred to in the case of a crank-shaft could only break or bend the crank-pin F′, which is easily and quickly replaced without disturbing any of the other parts. But another not less important advantage results from the use of the crank-wheel in this connection. The yoke, being arranged to play across and in contact with the face of the crank-wheel, is perfectly guided by the latter and held to its proper position at right angles with the shaft, and a smooth and steady motion results. The use of a crank-wheel is the more effective in connection with the frame before described, by which the main bearing of the shaft is in the frame itself, through which the shaft passes, and the other bearing upon a brace, I, supporting the frame J, and being itself supported from the bed-plate, as will be more particularly described hereinafter. In connection with the crank-wheel and yoke, so arranged and operating, I dispense entirely with the sliding box heretofore used with a yoke, and substitute therefor a roller, G, upon the crank-pin F′.

The disadvantages of the sliding-box device in pumps of this class are well known. Besides the initial expense of making and fitting them they require for their operation an absolutely true and perfect adjustment and movement of the connecting parts. This being in practice generally impossible to obtain or maintain, great friction and binding of the parts ensues and the movement of the fly-wheel is generally unreliable, besides entailing frequent and expensive renewal and repair. These disadvantages are entirely obviated by the use of the roller G, which fits freely upon the crank-pin F′ and plays between the parallel faces of the yoke A. The roller is not in the form of a perfect cylinder, but presents a slightly larger diameter in the center than at the ends. This enables the roller to reciprocate freely and uninterruptedly in the yoke, should the parts from irregularity of expansion and contraction or other causes lose their perfect alignment.

In the use of a roller in connection with a crank-plate arranged to guide the yoke the friction attending the use of a sliding box is entirely obviated, and a far more durable and economical structure is produced and a more reliable movement of the pump secured.

In connection with the roller I use upon the lower part of the yoke flanges H, which rise above the lower boundary of the slot upon both sides, between the ends thereof. There is thus formed, in connection with the lower face of the slot, a trough for the retention of oil, which materially aids in keeping the parts properly lubricated, and also serves to retain the roller on the crank-pin. These flanges are secured in position by screws, or in any other suitable manner, upon the exterior surface of the yoke, or may be cast therewith.

In forming the pistons and yoke I cast one-half the yoke A and its contiguous piston B together as one piece. Two of them, when placed together and united by bolts, as shown in the drawings, form a substantially-continuous piston with the yoke between. The advantages of this construction are important. The two parts may be cast from the same pattern and each entirely finished in the lathe in one operation. Thus the alignment of the pistons with reference to each other and to the yoke-slot is easily, economically, and accurately secured, and a much stronger, simpler, and more perfect connection formed than can be obtained in any other construction. Besides this, when it is necessary to remove the shaft and crank-wheel from the pump it is only necessary to remove the two bolts securing the parts together, force the two pistons to the extremities of their stroke, when the shaft and wheel can be removed or replaced between the separated part of the yoke with facility and dispatch.

The support I, which forms the outer bearing for the driving-shaft C, consists of an upright standard bolted below to the bed-plate upon which the pump rests, and having a lateral arm extending to and secured to the frame J by bolts or otherwise. The upright standard sustains the driving-shaft in a suitable journal-bearing, the other bearing of the shaft being in the frame J itself, or upon a suitable pillow-block cast with it. This arrangement of the parts not only furnishes the additional bearing required for the shaft, but also a lateral brace for the pump-frame.

The mode of operation has been already sufficiently indicated in the description of the various parts, and will be readily understood by reference thereto.

A separable yoke has heretofore been connected with the piston-rods of the pistons for driving a crank-shaft; but I do not, broadly, claim such feature.

Having described my invention, I claim and desire to secure by Letters Patent—

1. In combination with and connecting the steam and pumping cylinders of a direct-acting pump employing a yoke and fly-wheel, a concave shell-frame, open in front and arranged to partially surround the pistons and yoke at the sides and rear and furnish a bearing for the fly-wheel shaft in the frame in the plane of the pistons, substantially as specified.

2. The combination of the steam and pumping cylinders, the pistons and yoke, with the concave frame J partially surrounding the pistons, the driving-shaft *c*, passing through and having a bearing in the frame between the cylinders in the plane of the pistons, and the crank-plate F, arranged to operate in the concavity of the frame, substantially as specified.

3. In combination with the steam and pumping pistons of a direct-acting steam-pump, a fly-wheel shaft having a bearing between the cylinders, and a crank-plate upon the end of the fly-wheel shaft, and a yoke connecting the pistons, arranged to play across and in contact with the face of the crank-plate and be thereby guided and retained in its proper plane while imparting motion to the shaft, as set forth.

4. In combination with the cylinders C and D, connecting-frame J, and fly-wheel shaft *c*, having one of its bearings in the frame J, the double-armed detachable supporting-brace I, arranged to brace the frame from the base-plate, and also afford an outer bearing for the wheel-shaft, substantially as set forth.

5. In combination with the yoke A and roller G, the flanges H, substantially as and for the purpose set forth.

6. In combination with the steam and pumping cylinders and shaft-connections of a direct-acting steam-pump, the pistons B and separable yoke A, each part of the yoke and its contiguous piston being cast together as one piece, substantially as and for the purpose specified.

In testimony whereof I have hereunto set my hand and affixed my seal this 7th day of February, A. D 1881.

M. SCHULTZ. [L. S.]

In presence of—
JOSEPH C. HOSEA,
GEORGE C. SYNNESTOEDT.